(12) United States Patent
Ju et al.

(10) Patent No.: US 11,526,871 B2
(45) Date of Patent: Dec. 13, 2022

(54) CART ROBOT

(71) Applicant: LG ELECTRONICS INC., Seoul (KR)

(72) Inventors: Jeongwoo Ju, Seoul (KR); Jungsik Kim, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 16/847,259

(22) Filed: Apr. 13, 2020

(65) Prior Publication Data

US 2020/0402042 A1 Dec. 24, 2020

(30) Foreign Application Priority Data

Jun. 18, 2019 (WO) ................ PCT/KR2019/007341

(51) Int. Cl.
*G06Q 20/34* (2012.01)
*G06K 7/14* (2006.01)
*G06N 3/08* (2006.01)
*B62B 3/14* (2006.01)

(52) U.S. Cl.
CPC .......... *G06Q 20/34* (2013.01); *B62B 3/1424* (2013.01); *G06K 7/1413* (2013.01); *G06N 3/08* (2013.01); *B62B 2203/50* (2013.01); *G05B 2219/50391* (2013.01)

(58) Field of Classification Search
CPC ..... G06Q 20/30; G06Q 20/208; G06K 7/1413
USPC ................... 280/47.26; 235/479, 375; 705/23
See application file for complete search history.

(56) References Cited

U.S. PATENT DOCUMENTS

| | | |
|---|---|---|
| 8,950,671 B2 | 2/2015 | Chan et al. |
| 10,318,917 B1 | 6/2019 | Goldstein et al. |
| 10,321,275 B1 | 6/2019 | Orlov et al. |
| 10,552,788 B1* | 2/2020 | Hahn ...................... G08B 25/10 |
| 11,222,305 B1* | 1/2022 | Clayton ............... G06Q 10/087 |
| 2012/0284132 A1* | 11/2012 | Kim ........................ G06Q 20/18 |
| | | 235/375 |
| 2017/0221130 A1* | 8/2017 | Kraus ..................... H04L 67/12 |
| 2018/0024641 A1* | 1/2018 | Mao ........................ G06F 3/017 |
| | | 382/103 |
| 2018/0218351 A1* | 8/2018 | Chaubard .......... G01G 19/4144 |
| 2020/0034812 A1* | 1/2020 | Nemati ............... G06Q 20/085 |
| 2021/0342807 A1* | 11/2021 | Meidar ............... G06Q 20/208 |

FOREIGN PATENT DOCUMENTS

| | | |
|---|---|---|
| KR | 10-2012-0124198 A | 11/2012 |
| KR | 10-2014-0073630 A | 6/2014 |
| KR | 10-2017-0077446 A | 7/2017 |

(Continued)

*Primary Examiner* — Edwyn Labaze
(74) *Attorney, Agent, or Firm* — Birch, Stewart, Kolasch & Birch, LLP

(57) ABSTRACT

A cart robot analyzing a hand motion of a user is disclosed. The cart robot comprises a code input interface obtaining a product identification code, a sensor detecting a hand motion of a user, a weight measuring device measuring a weight of one or more products contained in a product loading space, and a controller. When there is no change in weight of the loaded products, the cart robot updates a shopping list with respect to the products loaded in the product loading space in real time by analyzing the hand motion of the user. Therefore, the convenience of the user is enhanced.

16 Claims, 5 Drawing Sheets

(56) References Cited

FOREIGN PATENT DOCUMENTS

| KR | 10-2018-0109124 A | 10/2018 | | |
|----|-------------------|---------|---|---|
| WO | WO-2017215362 A1 | * | 12/2017 | ............... H04N 7/18 |
| WO | WO-2020148762 A1 | * | 7/2020 | ........... G06K 9/0063 |

* cited by examiner

CART ROBOT

CROSS-REFERENCE TO RELATED APPLICATION

Pursuant to 35 U.S.C. § 119, this application claims the benefit of earlier filing date and right of priority to PCT Application No. PCT/KR2019/007341 filed on Jun. 18, 2019, the contents of which are all hereby incorporated by reference herein in their entirety.

BACKGROUND

1. Technical Field

The present disclosure relates to a cart robot, and more particularly, to a cart robot managing a shopping list based on a hand motion of a user.

2. Description of Related Art

Robots have been used mainly in specialized fields, such as in industrial and medical fields. Such robots are equipped with specialized functions, perform the corresponding functions at the installation site, and have limited interaction with people.

Recently, robots that may be conveniently used in daily life are being actively developed. These robots help people in daily life through interaction with people in homes, schools, and public places.

In Korean Patent Application Publication No. 1020140073630A entitled "Intelligent shopping method using shopping cart and shopping cart for the same", a shopping cart is disclosed, and the shopping cart includes a bar code reader recognizing product data and a display displaying the recognized product data and price data. Here, when a card payment is completed for a product in a shopping cart that a user wants to purchase, a delivery address of the product contained in the shopping cart is automatically designated based on user data of the card.

However, the shopping cart disclosed above only recognizes product data using a bar code reader, and does not automatically determine whether the corresponding product is actually contained in a user's shopping cart.

In U.S. Pat. No. 8,950,671B2, entitled "Item scanning in a shopping cart", a shopping cart is disclosed, and the shopping cart includes a weight sensor detecting a change in weight of one or more items contained in a shopping cart, and an RFID reader reading an RFID tag of the item. When a change in weight is detected by the weight sensor, the RFID reader is activated to read an item loaded into a shopping cart, and a product list is determined.

However, the aforementioned shopping cart determines whether an item has been loaded only based on a change in weight. Therefore, when a user adds a significantly light item to a cart, it may not be determined properly whether the corresponding item has been loaded. In addition, in Related Art 2, when a user changes his or her mind and removes a product from the cart during shopping, the corresponding product may not be automatically removed from a purchase list.

SUMMARY OF THE INVENTION

An object of the present disclosure is to provide a cart robot automatically updating a shopping list when a product that a user wants to purchase is added to a cart or removed from the cart.

Another object of the present disclosure is to provide a cart robot capable of detecting addition or removal of a product which is not detectable by a weight measuring device due to having a light weight.

The technical objects of the present invention are not limited to the above-mentioned technical objects, and other technical objects, which are not mentioned, may be clearly understood by those skilled in the art from the description below.

To achieve the above objects, a cart robot according to an embodiment of the present disclosure may determine whether a user actually has actually added a product to a product loading space and whether a user actually has actually removed the product from the product loading space, based on a hand motion of the user.

In detail, the cart robot may comprise a sensor detecting a hand motion of a user while a product to be purchased by the user is added to or removed from the product loading space of the cart robot.

The sensor of the cart robot may detect a product addition operation of adding the product to the product loading space and a product removal operation of removing the product from the product loading space, based on a change in a hand shape of the user.

To achieve the above objects, a cart robot according to an embodiment of the present disclosure comprises a controller analyzing a hand motion of the user when there is no change in weight of one or more products loaded in a cart robot.

In detail, when there is no change in weight of the loaded products, the controller may update a shopping list based on the hand motion of the user, detected by the sensor.

The controller may classify the hand motion detected by the sensor as one of a product addition operation or a product removal operation, using a trained model based on an artificial neural network.

The controller may add product data recognized through a code input interface to a purchase list, when the hand motion detected by the sensor is a product addition operation.

The controller may delete the product data recognized through the code input interface from the purchase list, when the hand motion detected by the sensor is a product removal operation.

The solution to the technical problems of the present invention is not limited to the above-mentioned solutions, and other solutions, which are not mentioned, may be clearly understood by those skilled in the art from the description below.

According to various embodiments of the present disclosure, the following effects can be obtained.

First, when there is no change in weight of one or more loaded products, it is determined whether a product has been loaded or unloaded based on a hand motion of a user. Thus, a cart robot capable of accurately recognizing whether a product has actually been loaded into or unloaded from a product loading space by a user may be provided.

Second, loaded or unloaded product data may be automatically reflected in a shopping list based on a convenient code entry and a hand motion. Thus, the convenience of the user may be enhanced.

Third, the cart robot may classify a detected hand motion as one of a product addition operation or a product removal operation using a trained model based on an artificial neural network. Thus, accuracy of hand motion recognition may be improved.

BRIEF DESCRIPTION OF DRAWINGS

The foregoing and other objects, features, and advantages of the invention, as well as the following detailed description of the embodiments, will be better understood when read in conjunction with the accompanying drawings. For the purpose of illustrating the invention, there is shown in the drawings an exemplary embodiment that is presently preferred, it being understood, however, that the invention is not intended to be limited to the details shown because various modifications and structural changes may be made therein without departing from the spirit of the invention and within the scope and range of equivalents of the claims. The use of the same reference numerals or symbols in different drawings indicates similar or identical items.

DETAILED DESCRIPTION

Figure 1:
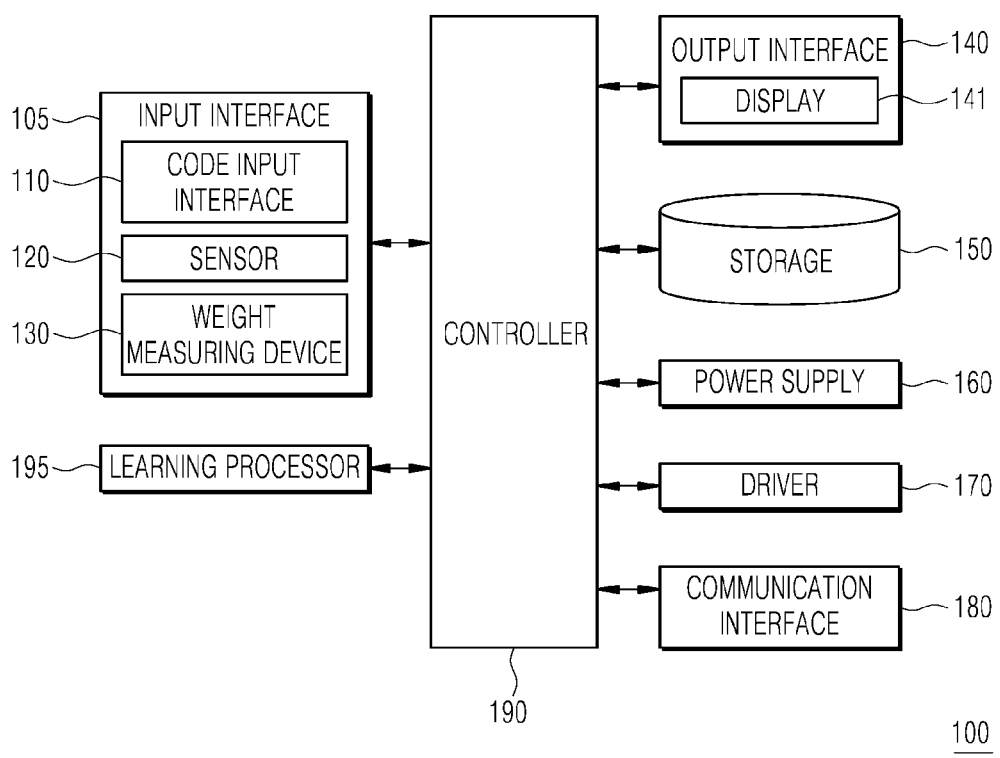
FIG. 1 is a block diagram illustrating a configuration of a cart robot according to an embodiment of the present disclosure.

Hereinafter, an embodiment disclosed herein will be described in detail with reference to the accompanying drawings, and the same reference numerals are given to the same or similar components and duplicate descriptions thereof will be omitted. In the following description of the embodiments of the present disclosure, a detailed description of related arts will be omitted when it is determined that the gist of the embodiments disclosed herein may be obscure.

FIG. 1 is a block diagram illustrating a configuration of a cart robot 100 according to an embodiment of the present disclosure.

The cart robot 100 may comprise an input interface 105, an output interface 140, a storage 150, a power supply 160, a driver 170, a communication interface 180, a controller 190, and a learning processor 195. However, the components illustrated in FIG. 1 are not essential for implementing the cart robot 100, and the cart robot 100 described herein may have more or fewer components than those listed above.

In detail, the input interface 105 comprises a code input interface 110 obtaining a product identification code, a sensor 120 obtaining a hand motion of a user, and a weight measuring device 130 measuring a weight of one or more products. Input data, acquired by the input interface 105, may be analyzed to be processed as a control command of a user in a controller 190 (to be described below).

The code input interface 110 may obtain product identification data by means of a tagging operation or a scanning operation. Accordingly, a procedure of manually inputting product identification data and product data may be omitted, so that an error in which the product identification data and the product data are incorrectly entered may be eliminated and the convenience of the user may be enhanced. The product identification code may include, for example, a bar code, a quick response (QR) code, and a radio-frequency identification (RFID) tag.

The code input interface 110 may be disposed in a product inlet of the cart robot 100 as a separate device, or may be disposed in a region of a display 141.

The controller 190 may recognize product data from the product identification data, obtained through the code input interface 110.

The sensor 120 may comprise at least one sensor for sensing at least one among internal data of the cart robot 100, data on a surrounding environment surrounding the cart robot 100, and user data.

In detail, the sensor 120 comprises a depth sensor detecting a hand motion of a user for loading a product into a product loading space of the cart robot 100 or unloading a product from the product loading space.

When there is no change in weight of one or more products loaded in the product loading space, the controller 190 analyzes the hand motion detected by the sensor 120. Thus, the controller 190 may accurately recognize whether a product has actually been loaded into or unloaded from the product loading space by a user, and may automatically reflect a recognition result in a shopping list.

The sensor 120 may comprise at least one among, for example, a proximity sensor, an illumination sensor, a touch sensor, an acceleration sensor, a magnetic sensor, a gravity sensor (G-sensor), a gyroscope sensor, a motion sensor, an RGB sensor, an infrared (IR) sensor, a finger scan sensor, an ultrasonic sensor, an optical sensor (for example, a camera), a microphone, a battery gauge, an environment sensor (for example, a barometer, a hygrometer, a thermometer, a radiation detection sensor, a heat detection sensor, a gas detection sensor, and the like), and a chemical sensor (for example, an electronic nose, a healthcare sensor, a biometric sensor, and the like). The cart robot 100 disclosed herein may use data sensed by at least one among these sensors.

The weight measuring device 130 may be provided in a product loading space of the cart robot 100. The product loading space of the cart robot 100 includes at least one zone, and the weight measuring device 130 may be disposed in each zone.

The controller 190 may control the weight measuring device 130 so as to detect that a specific product has been loaded into the cart robot 100. The controller 190 may determine that a product has been loaded when loading is detected through the weight measuring device 130. For example, the controller 190 may determine that a product, corresponding to a product identification code received by the code input interface 110, has been loaded when loading is detected through the weight measuring device 130.

The controller 190 may accurately measure a weight of a specific product using the weight measuring device 130. The controller 190 may determine that the specific product has been unloaded from the product loading space when the total weight of products in the product loading space decreases by the weight of the specific product.

The input interface 105 may acquire various kinds of data, such as learning data for model learning and input data used when an output is acquired using a trained model. The input interface 105 may acquire raw input data. In this case, the controller 190 or the learning processor 195 may extract an input feature as preprocessing with respect to input data. The preprocessing with respect to input data refers to extracting one set of skeleton images from one set of depth maps with respect to a hand motion.

The output interface 140 is configured to generate an output related to, for example, sight, hearing, and touch, and may comprise at least one among a display (141, also applicable as a plurality of displays), one or more light emitting elements, a sound output interface, and a haptic module. The display 141 may form a mutual layer structure with a touch sensor, or may be formed integrally therewith, and thus may be provided as a touch screen. The touch screen may function as a user input interface providing an input interface between the cart robot 100 and a user, while also providing an output interface between the cart robot 100 and the user.

The storage 150 may store data supporting various functions of the cart robot 100. The storage 150 may store a plurality of applications (or application programs) driven in the cart robot 100, data for an operation of the cart robot 100, and commands. At least some of these application programs may be downloaded from an external server via wireless communications. Moreover, the storage 150 may store data on the current user of the cart robot 100. The user data may be used for user identification of the cart robot 100.

The storage 150 may store a shopping list related to one or more products contained in the cart robot 100. The shopping list may include product data of each product loaded in a product loading space of the cart robot 100. The product data may include, for example, product identification data, the product price, the weight of the product, the quantity of the product, data on shelf life, a storage method, and data on age restrictions on purchasing. In the shopping list, data may be arranged and stored according to product price, but may also be arranged according to other options. The controller 190 may update the shopping list whenever a product is loaded into the product loading space, or whenever a product is unloaded from the product loading space.

The power supply 160 receives external power and internal power to supply power to each component of the cart robot 100, under the control of the controller 190. The power supply 160 comprises a battery. The battery may be provided as a built-in battery or a replaceable battery. The battery may be charged in a wired or wireless charging method, and the wireless charging method may include a magnetic induction method or a magnetic resonance method.

The controller 190 may move the cart robot 100 to a pre-designated charging station to charge a battery when the battery of the power supply 160 is insufficient to perform a transport operation.

The driver 170 is a module driving the cart robot 100, and may comprise a driving device and a driving motor that moves the driving device.

The communication interface 180 may transmit or receive data with external devices, such as other cart robots or a control center, or an artificial intelligence (AI) server 900, using the wired/wireless communications technology. For example, the communication interface 180 may transmit or receive sensor data, a user input, a trained model, a control signal, and the like with the external devices.

In this case, the communications technology used by the communication interface 180 may be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC).

The controller 190 corresponds to a controller variously controlling the components described above, and the controller 190 may manage a shopping list related to products loaded in a product loading space based on the input data, acquired by the input interface 105. The controller 190 may include, for example, a microprocessor, a central processor (CPU), a processor core, a multiprocessor, an application-specific integrated circuit (ASIC), a field programmable gate array (FPGA), and the like, but the scope of the present disclosure is not limited thereto. The controller 190 may include one or more processors.

In detail, when there is no change in weight of the products loaded in the product loading space, the controller 190 analyzes the hand motion, detected by the sensor 120. In one example, the controller 190 may classify the hand motion detected by the sensor 120 as one of a product addition operation or a product removal operation, using a trained model based on an artificial neural network. Hereinafter, the artificial neural network will be briefly described.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

The ANN is a data processing system modelled after the mechanism of biological neurons and interneuron connections, in which a number of neurons, referred to as nodes or processing elements, are interconnected in layers. ANNs are models used in machine learning and may include statistical learning algorithms conceived from biological neural networks (particularly of the brain in the central nervous system of an animal) in machine learning and cognitive science. In detail, ANNs may refer generally to models that have artificial neurons (nodes) forming a network through synaptic interconnections, and acquire problem-solving capability as the strengths of synaptic interconnections are adjusted throughout training. ANN may include a number of layers, each including a number of neurons. Furthermore, the ANN may include synapses that connect the neurons to one another.

The ANN may be defined by the following three factors: (1) a connection pattern between neurons on different layers; (2) a learning process that updates synaptic weights; and (3) an activation function generating an output value from a weighted sum of inputs received from a lower layer. ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons An ANN trained using training data can classify or cluster inputted data according to a pattern within the inputted data. Throughout the present specification, an artificial neural network trained using training data may be referred to as a trained model. The trained model may be used for inferring a result value with respect to new input data rather than training data.

As described above, the controller 190 may classify the hand motion detected by the sensor 120 as one of a product addition operation or a product removal operation using a trained model, an artificial neural network learned using training data with respect to the hand motion. Thus, the controller 190 may recognize whether a product has actually been loaded into or unloaded from a product loading space by a user, and may reflect a recognition result in a shopping list.

The trained model may be mounted in the cart robot 100. The trained model may be implemented as hardware, software, or a combination of hardware and software. Here, when a portion or the entirety of the trained model is implemented as software, one or more commands, constituting the trained model, may be stored in the storage 150.

In one example, the trained model may be generated by an AI server 900, to be described below with reference to FIG. 9. The controller 190 may receive the trained model from the AI server 900 through the communication interface 180.

The cart robot 100 may comprise a learning processor 195 allowing a model, composed of an artificial neural network, to be trained using training data. The learning processor 195 may repeatedly train the artificial neural network, and may thus determine optimized model parameters of the artificial neural network to thereby generate a trained model, and may provide the trained model, used for classification of hand motion, to the controller 190.

The learning processor 195 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation of classifying the detected hand motion.

The learning processor 195 may perform AI processing together with a learning processor 940 of the AI server 900.

The learning processor 195 may comprise a memory integrated with or implemented in the cart robot 100. Alternatively, the learning processor 195 may be implemented using the storage 150, an external memory directly coupled to the cart robot 100, or a memory maintained in an external device.

Figure 2:
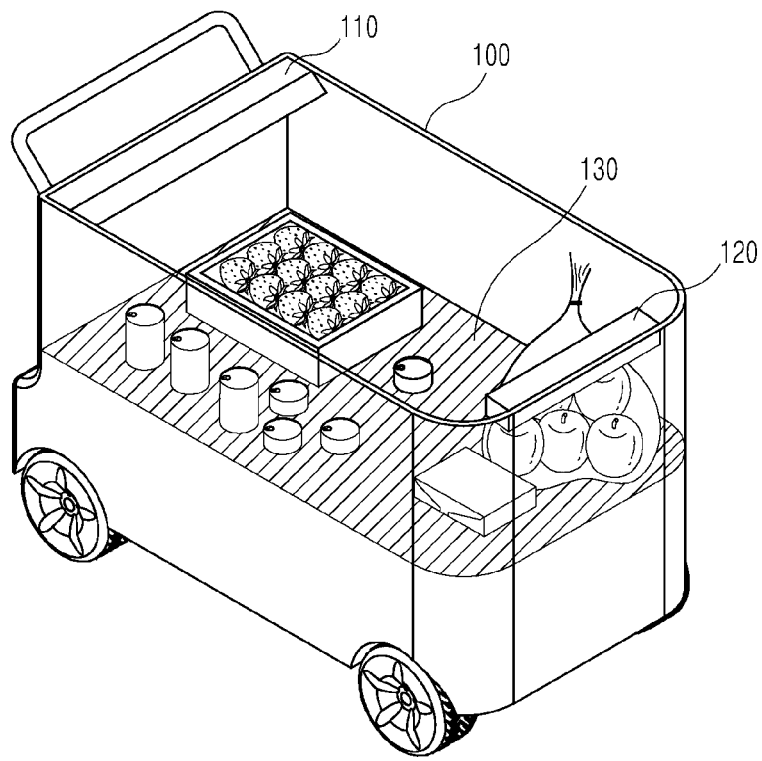
FIG. 2 is an external perspective view of a cart robot according to an embodiment of the present disclosure.

FIG. 2 is an external perspective view of a cart robot 100 according to an embodiment of the present disclosure.

The cart robot 100 is a robot that helps a user desiring to purchase a product at a mart or a shopping mall, and has a product loading space. The user selects a product during shopping, and loads the product into the product loading space of the cart robot 100 to be transported therein.

The cart robot 100 may reflect addition or removal of a product in a shopping list in real time whenever the user adds the corresponding product to or removes the corresponding product from the product loading space. To this end, the cart robot 100 comprises a code input interface 110 receiving a product identification code, a sensor 120 detecting a hand motion of a user, and a weight measuring device 130 measuring a weight of a product contained in the product loading space.

The code input interface 110 may be disposed at a position adjacent to a product inlet for adding a product to or removing a product from the loading space. For example, the code input interface 110 may be disposed near a handle of the cart robot 100.

The sensor 120 may be disposed inside the product loading space in a direction facing the interior of the product loading space. For example, the sensor 120 may be disposed at a position opposite to a handle of the cart robot 100. In FIG. 2, a single sensor 120 is illustrated by way of example, but the embodiments of the present disclosure are not limited thereto. Alternatively, at least one sensor 120 may be disposed at another side of a product loading space in a direction facing the interior of the product loading space.

The weight measuring device 130 may be disposed in a lower portion of the product loading space. For example, the weight measuring device 130 may be disposed to cover the entire lower portion of the product loading space. When the product loading space includes a plurality of zones, the weight measuring device 130 may be disposed in each zone of the product loading space.

The cart robot 100 comprises a storage 150 storing a shopping list related to products contained in the product loading space, and a controller 190.

The controller 190 recognizes product data based on a product identification code obtained through the code input interface 110. That is, the controller 190 acquires product data from the storage 150 based on the obtained product identification code, or from a server through the communication interface 180. The product data may include, for example, product identification data, the product price, the weight of the product, the quantity of the product, data on shelf life, a storage method, and data on age restrictions on purchasing.

When there is no change in a measured value of the weight measuring device 130, the controller 190 updates the shopping list stored in the storage 150 by analyzing the hand motion of a user, detected by the sensor 120. For example, when the detected hand motion is a product addition operation, the controller 190 adds the product data corresponding to a product identification code, received by the code input interface 110, to the shopping list. For further example, when the detected hand motion is a product removal operation, the controller 190 drives the code input interface 110 to receive a product identification code, and removes the product data corresponding to the obtained product identification code from the shopping list.

The controller 190 may output the shopping list through the output interface 140. The user may directly input a delivery address of a product contained in the cart robot 100 using a touch keypad displayed on a touch screen of the output interface 140. Alternatively, the user may input membership information of the user of the touch keypad, and an address associated with the membership information may be designated as the delivery address.

The cart robot 100 may further comprise a card reader. The user may cause a card to be read by the card reader or bring the card into contact with the card reader, and may thus make a payment for a product being carried by the cart robot 100. The card reader may be provided as a portion of the display 141.

Hereinafter, a shopping list management operation of a cart robot 100 based on a hand motion will be described with reference to FIGS. 3 and 4.

Figure 3:
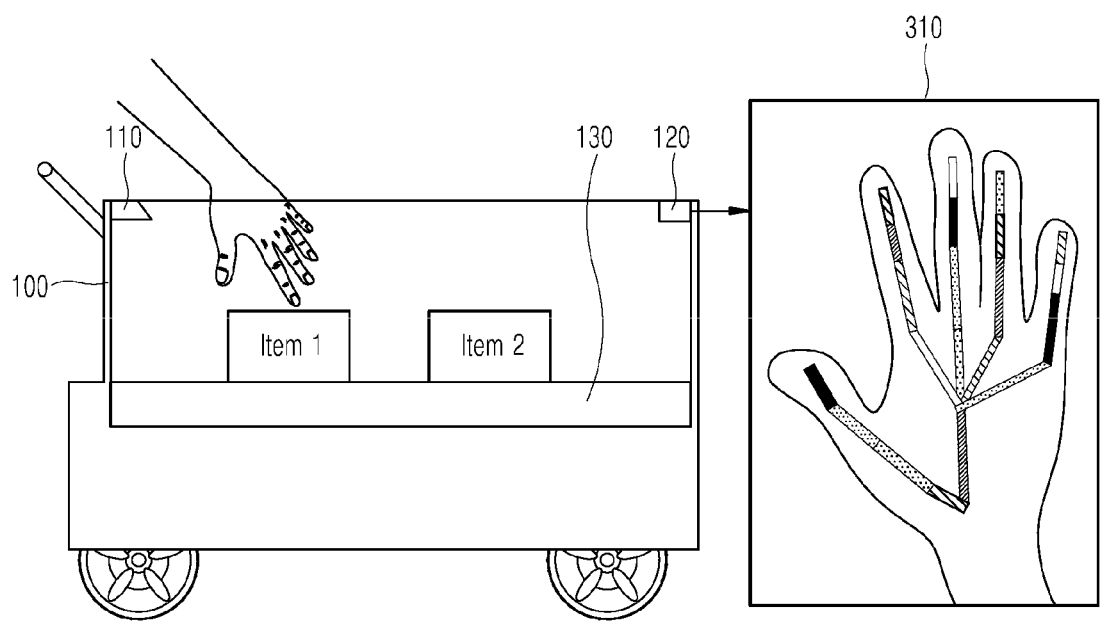
FIG. 3 is a view illustrating an operation of a cart robot based on a hand motion according to an embodiment of the present disclosure.

FIG. 3 is a view illustrating an operation of a cart robot 100 based on a hand motion according to an embodiment of the present disclosure.

The user provides, to the code input interface 110, a product identification code of a product that the user wants to purchase, and adds the product to the product loading space. The weight measuring device 130 detects a change in weight, and provides the change in weight to the controller 190. The controller 190 determines data and a quantity of the product added by the user based on the obtained product identification data and the detected change in weight, and reflects the determined data and quantity in the shopping list.

When there is no change in weight detected by the weight measuring device 130, the controller 190 analyzes the hand motion detected by the sensor 120. The controller 190 acquires one set of hand images by analyzing the hand motion of the user, detected by the sensor 120, and updates the shopping list based on the acquired one set of hand images. Here, the sensor 120 is provided as a depth sensor, and one set of hand images, acquired by the controller 190, may be one set of skeleton images, acquired from a depth map of the hand motion detected by the depth sensor.

When there is no change in weight detected by the weight measuring device 130, the controller 190 determines whether the one set of skeleton images, corresponding to the hand motion of a user, corresponds to a product addition operation. To this end, the controller 190 may classify the one set of skeleton images, corresponding to the hand motion of a user, as one of a product addition operation or a product removal operation, using a trained model based on an artificial neural network. When the product addition operation is determined, the controller 190 adds product data corresponding to the product identification data obtained by the code input interface 110 to the shopping list.

A box 310 illustrates a skeleton image with respect to a hand shape received by the sensor 120, by way of example.

The skeleton image refers to an image in which the center of the image and an internal skeletal structure and shape are extracted from a stereoscopic image of an object. For example, a skeleton image of a hand is a skeletal model in which the center of an image corresponding to a hand region and an internal skeletal structure and shape are extracted, and includes data on not only the shape of the hand, such as the width of the palm, a ratio of the lengths of the palm and a finger, the length of each finger, the distance between fingers, and a finger joint position, but also an angle at which a finger joint is bent, a position of a fingertip, a position of the wrist, and the like.

That is, in an embodiment of the present disclosure, a hand shape is recognized in a skeletal unit, so that a difference between similar hand shapes may be clearly distinguished based on a skeletal model, and a hand motion may be accurately recognized. In addition, when a hand shape is recognized, effects due to an angle or a size of the hand and overlapping may be significantly reduced, and a hand motion recognition error caused by a difference in hand shapes among individuals may be reduced.

When the user no longer wishes to purchase a product already contained in the cart robot 100, the user may remove the corresponding product from the product loading space, and provide the product identification code of the removed product to the code input interface 110. The weight measuring device 130 detects a change in weight, and provides the change in weight to the controller 190. The controller 190 determines data and a quantity of the product removed by the user, based on the obtained product identification data and the detected change in weight, and reflects the determined data and quantity in the shopping list.

When there is no change in weight detected by the weight measuring device 130, the controller 190 analyzes the hand motion detected by the sensor 120. The controller 190 acquires one set of hand images by analyzing the hand motion of the user, detected by the sensor 120. Here, the sensor 120 is provided as a depth sensor, and one set of hand images, acquired by the controller 190, may be one set of skeleton images, acquired from a depth map of the hand motion detected by the depth sensor.

That is, when there is no change in weight detected by the weight measuring device 130, the controller 190 determines whether the one set of skeleton images, corresponding to the hand motion of a user, corresponds to a product removal operation. To this end, the controller 190 may classify the one set of skeleton images, corresponding to the hand motion of a user, as one of a product addition operation or a product removal operation, using a trained model based on an artificial neural network. When the product removal operation is determined, the controller 190 deletes the product data corresponding to the product identification data obtained by the code input interface 110 from the shopping list.

Meanwhile, the controller 190 may directly analyze the hand motion acquired by the sensor 120, or may transmit the hand motion to a server through the communication interface 180. The server generates one set of skeleton images, corresponding to the hand motion, determines whether a product has been loaded or unloaded, and transmits a result of the determination to the cart robot 100. For example, the server may be provided as an AI server 900 (to be described below with reference to FIG. 9), and the AI server 900 may classify the hand motion acquired by the sensor 120 as one of a product addition operation or a product removal operation using a trained model based on an artificial neural network. The controller 190 may receive the result of determination through the communication interface 180, and reflect the result of determination in the shopping list.

Figure 4:
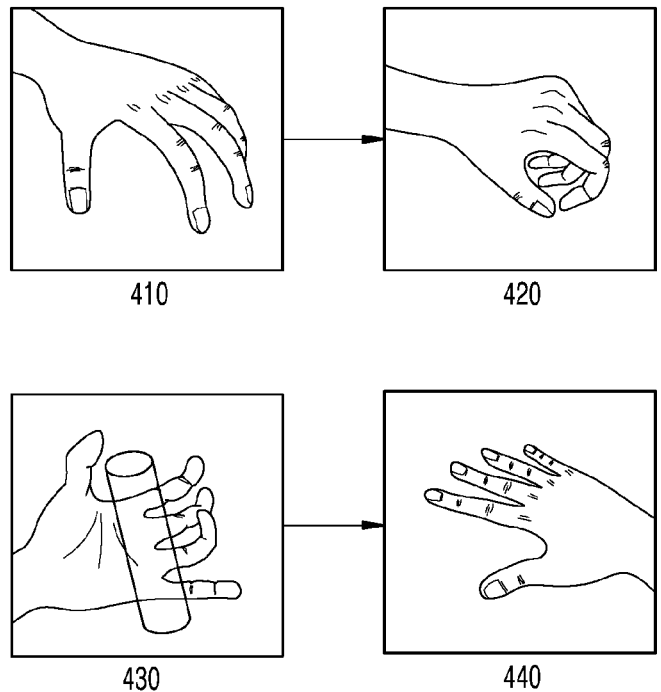
FIG. 4 is a view illustrating an exemplary hand motion of a user according to an embodiment of the present disclosure.

FIG. 4 is a view illustrating an exemplary hand motion of a user according to an embodiment of the present disclosure.

BOX 410 and BOX 420 illustrate the hand motion when a product is removed from the cart robot 100. In this case, when the hand is inserted into the cart, the hand shape is open as illustrated in BOX 410 since the hand is empty. When the hand is removed from the cart, the hand shape is cupped as illustrated in BOX 420 since the hand is holding a product.

BOX 430 and BOX 440 illustrate the hand motion when a product is added to the cart robot 100. In this case, when the hand is inserted into the cart, the hand shape is cupped as illustrated in BOX 430 since the hand is holding a product. When the hand is removed from the cart, the hand shape is open as illustrated in BOX 440 since the hand is empty.

The hand shapes illustrated in FIG. 4 are provided for description, and the embodiments of the present disclosure are not limited thereto. Alternatively, the hand shape may vary within the scope of the present disclosure, to include hand shapes such as a hand shape holding a product, a hand shape moving a product, and a hand shape releasing a product.

Figure 5:
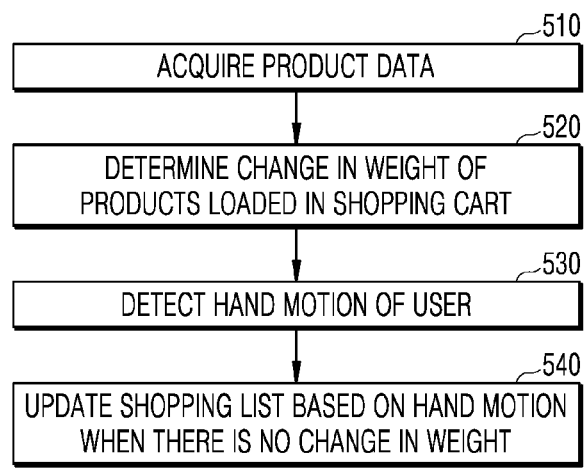
FIG. 5 is a flow chart illustrating a process of a method for managing a shopping list of a cart robot according to an embodiment of the present disclosure.

FIG. 5 is a flow chart illustrating a process of a shopping list management method of a cart robot 100 according to an embodiment of the present disclosure.

The shopping list management method of the cart robot 100 comprises a step 510 of acquiring product data based on a product identification code obtained by the code input interface 110, a step 520 of determining a change in weight of products loaded in a product loading space based on a measured value of the weight of the products measured by the weight measuring device 130, a step 530 of detecting a hand motion of the user, and a step 540 of updating a shopping list based on the detected hand motion when there is no change in weight.

In step 510, the code input interface 110 obtains a product identification code, and the controller 190 acquires product data based on the obtained product identification code. For example, the controller 190 may acquire product data from the storage 150 or a server.

In step 520, the weight measuring device 130 measures a measured value of the weight of the product, and the controller 190 determines a change in weight of the products loaded in the product loading space based on the measured value of the weight of the product. Alternatively, the weight measuring device 130 directly determines a change in weight of the products loaded in the product loading space, and transmits the change in weight to the controller 190.

In step 530, when there is no change in weight, the controller 190 acquires the hand motion, detected by the sensor 120. For example, the sensor 120 may be a depth sensor, and the controller 190 may acquire one set of depth maps including a hand motion of the user.

In step 540, the controller 190 updates the shopping list based on the acquired hand motion. For example, the controller 190 extracts one set of skeleton images based on the acquired hand motion. When the extracted one set of skeleton images and the product addition operation are compared and matched with each other, the controller 190 adds the product data acquired in step 510 to the shopping list. When the extracted one set of skeleton images and the product removal operation are compared and matched with each other, the controller 190 deletes the product data acquired in step 510 from the shopping list.

In step 540, the controller 190 classifies the hand motion acquired in step 530 as one of a product addition operation or a product removal operation using a trained model based on an artificial neural network. The input data of the trained model may be one set of depth maps acquired using a depth sensor in step 530, or one set of skeleton images extracted from one set of depth maps. The trained model may determine whether the hand motion acquired in step 530 is a product addition operation or a product removal operation using the input data described above.

The trained model may be mounted in the cart robot 100 while being stored in the storage 150. The controller 190 may communicate with an external server, and may thus also use a trained model mounted on the external server. For example, the external server includes an AI server 900, to be described below with reference to FIG. 9.

Figure 6:
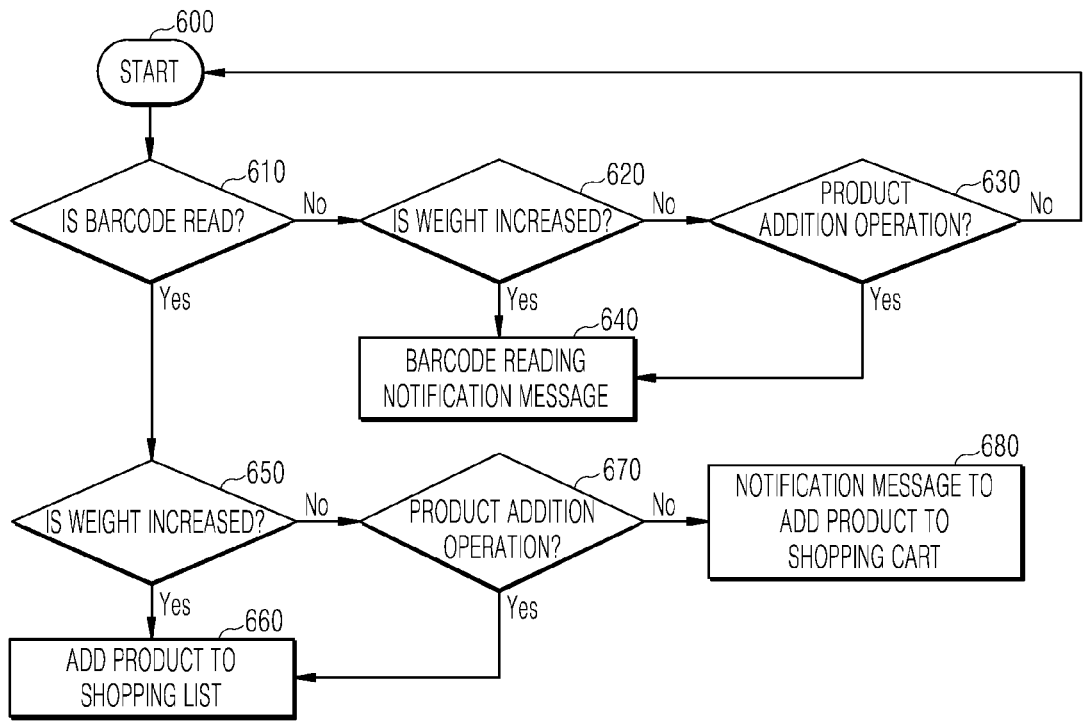
FIG. 6 is a flow chart illustrating a product addition process according to an embodiment of the present disclosure.

FIG. 6 is a flow chart illustrating a product addition process according to an embodiment of the present disclosure.

An operation of the cart robot 100 is started in step 600, and the controller 190 checks whether the code input interface 110 has read product identification data (for example, a bar code of a product) in step 610.

When the controller 190 recognizes barcode reading of the code input interface 110 in step 610, the controller 190 determines whether the weight of products loaded in a product loading space has increased through the weight measuring device 130 in step 650.

When the weight of the products is determined to have increased in step 650, the controller 190 adds product data corresponding to the product identification data recognized in step 610 to a shopping list in step 660.

When no change in weight of the products is determined in step 650, the controller 190 acquires a hand motion of the user, detected by the sensor 120, and analyzes the hand motion to determine whether the hand motion is a product addition operation in step 670. In the case of the product addition operation, step 660 is performed. For example, the controller 190 may determine whether the hand motion detected by the sensor 120 is a product addition operation, using a trained model based on an artificial neural network.

When the product addition operation is not detected in step 670, the controller 190 outputs a notification message through the output interface 140 notifying the user to add a product to the shopping cart in step 680.

When no product identification data is recognized by the code input interface 110 in step 610, the controller 190 determines whether the weight of the products loaded in the product loading space has increased through the weight measuring device 130 in step 620.

When the weight is determined to have increased in step 620, the controller 190 outputs a notification message through the output interface 140, notifying the user to input product identification data through the code input interface 110.

When no change in weight is determined in step 620, the controller 190 acquires the hand motion of the user, detected by the sensor 120, and analyzes the hand motion to determine whether the hand motion is a product addition operation in step 630. In the case of the product addition operation, step 640 is performed.

In the case in which the hand motion is determined not to be a product addition operation in step 630, the process returns to step 600.

Figure 7:
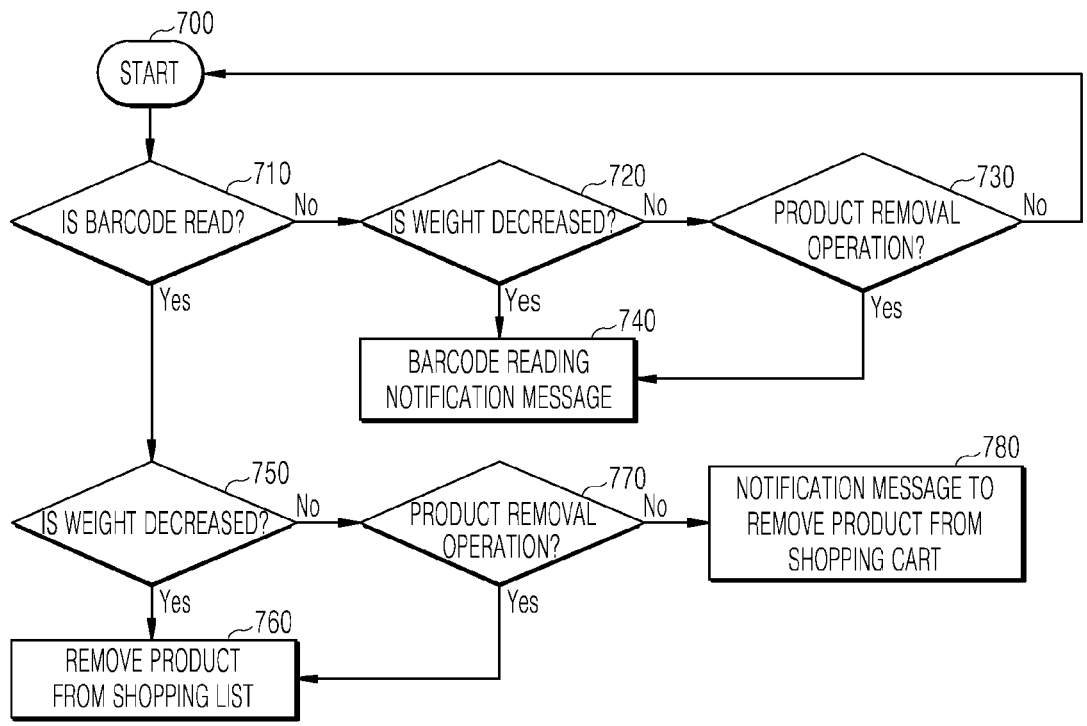
FIG. 7 is a flow chart illustrating a product removal process according to an embodiment of the present disclosure.

FIG. 7 is a flow chart illustrating a product removal process according to an embodiment of the present disclosure.

An operation of the cart robot 100 is started in step 700, and the controller 190 checks whether the code input interface 110 has read product identification data (for example, a bar code of a product) in step 710.

When the controller 190 recognizes barcode reading of the code input interface 110 in step 710, the controller 190 determines whether the weight of products loaded in a product loading space has decreased through the weight measuring device 130 in step 750.

When the weight of the products is determined to have decreased in step 750, the controller 190 deletes product data corresponding to the product identification data recognized in step 710 from a shopping list in step 760.

When no change in weight of the products is detected in step 750, the controller 190 acquires the hand motion of the user, detected by the sensor 120, and analyzes the hand motion to determine whether the hand motion is a product removal operation in step 770. For example, the controller 190 may determine whether the hand motion detected by the sensor 120 is a product removal operation, using a trained model based on an artificial neural network. In the case of the product removal operation, step 760 is performed.

When the product removal operation is not detected in step 770, the controller 190 outputs a notification message through the output interface 140, notifying the user to remove a product from the shopping cart in step 780.

When no product identification data is recognized by the code input interface 110 in step 710, the controller 190 determines whether the weight of the products loaded in the product loading space has decreased through the weight measuring device 130 in step 720.

When the weight is determined to have decreased in step 720, the controller 190 outputs a notification message through the output interface 140, notifying the user to input product identification data through the code input interface 110.

When no change in weight is determined in step 720, the controller 190 acquires the hand motion of the user, detected by the sensor 120, and analyzes the hand motion to determine whether the hand motion is a product removal operation in step 730. In the case of the product removal operation, step 740 is performed.

In the case in which the hand motion is determined not to be a product removal operation in step 730, the process returns to step 700.

Figure 8:
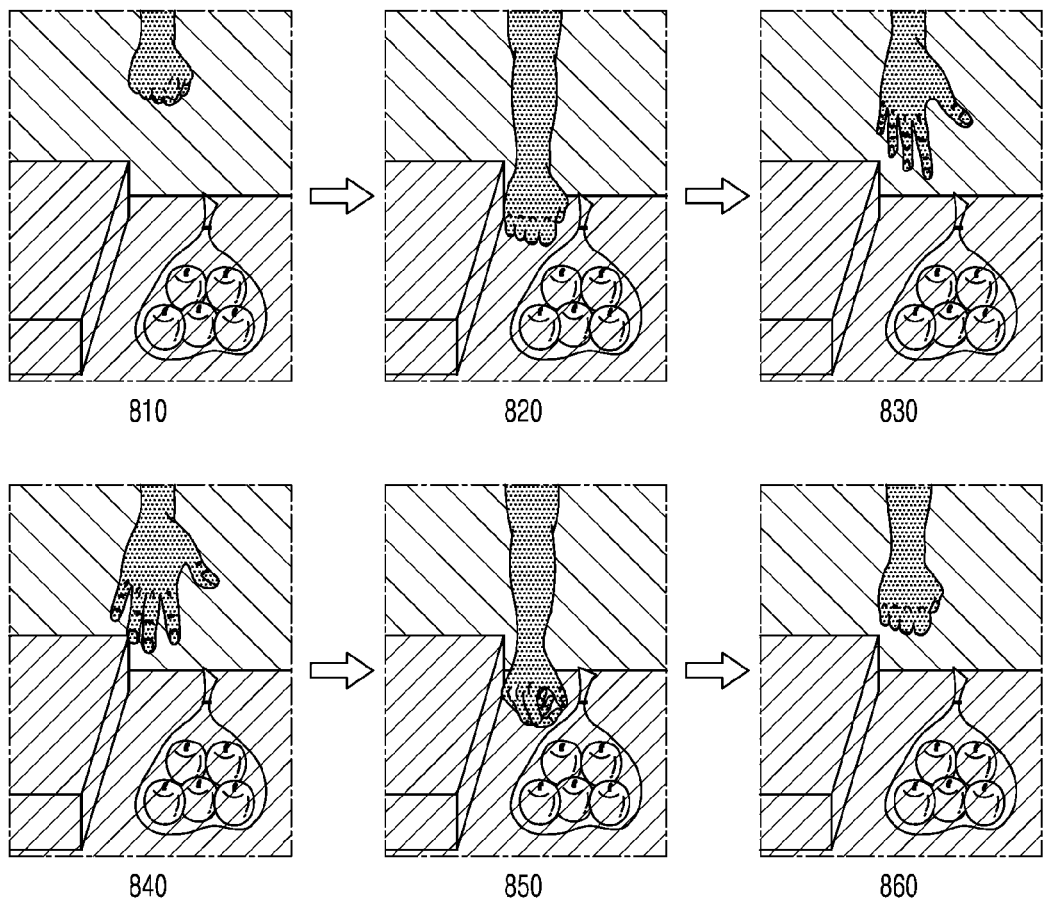
FIG. 8 is a view illustrating a depth map for analyzing a hand motion of a user according to an embodiment of the present disclosure.

FIG. 8 is a view illustrating a depth map for analyzing a hand motion of a user according to an embodiment of the present disclosure, by way of example.

Each box in FIG. 8 is a depth map acquired in a direction in which a sensor 120 faces an interior of a product loading space of a cart robot 100, when the sensor 120 is a depth sensor.

BOX 810, BOX 820 and BOX 830 illustrate depth maps of hands and arms when a product is placed in the cart robot 100. BOX 810 is a depth map in which a hand, having a cupped shape and holding a product, approaches the cart robot 100. BOX 820 is a depth map in which the product is placed in a product loading space. BOX 830 is a depth map in which a hand, having an open shape after having placed the product in the product loading space, is being removed from the product loading space.

BOX 840, BOX 850 and BOX 860 illustrate depth maps of hands and arms when a product is removed from the cart robot 100. BOX 840 is a depth map in which a hand, having an open shape, approaches the cart robot 100. BOX 850 is a depth map illustrating a hand shape holding a product in a product loading space. BOX 860 is a depth map in which a hand holding a product is being removed from the product loading space.

The controller 190 may extract one set of skeleton images from such depth maps to determine whether a product has been loaded or unloaded, and may thus update the shopping list. However, the hand shapes illustrated in each box of FIG. 8 are provided by way of example, and the embodiments of the present disclosure are not limited thereto.

Figure 9:
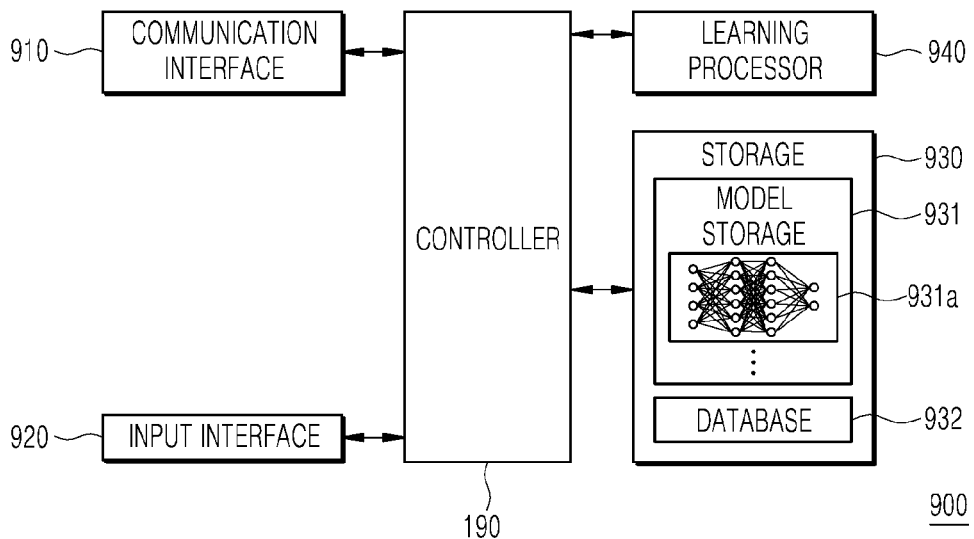
FIG. 9 is a block diagram of an AI server according to an embodiment of the present disclosure.

FIG. 9 is a block diagram of an AI server 900 according to an embodiment of the present disclosure.

The AI server 900 may refer to a device for training an artificial neural network using a machine learning algorithm or using a trained artificial neural network. Here, the AI server 900 may include a plurality of servers to perform distributed processing, and may be defined as a 5G network. In this case, the AI server 900 may be included as a part of the cart robot 100, and may thus perform at least a portion of the AI processing together with the cart robot 100.

The AI server 900 may comprise a communication interface 910, an input interface 920, a storage 930, a learning processor 940, and a controller 950. However, the components illustrated in FIG. 9 are not essential for implementing the AI server 900, and the AI server 900 may have more or fewer components than those listed above.

The AI server 900 is a device or server separately configured outside the cart robot 100, and may generate a trained model for classifying a hand motion of a user to provide the trained model to the cart robot 100. The AI server 900 may be provided as various devices for training the artificial neural network, may usually refer to a server, and may be referred to as an AI server or a learning server. The AI server 900 may be implemented as not only a single server, but also a combination of a plurality of server sets, a cloud server, or combinations thereof.

The AI server 900 may communicate with at least one cart robot 100, and may transmit a trained model for classification of the hand motion of the user to the cart robot 100, periodically or on request. Moreover, the AI server 900 may receive the hand motion, acquired by the cart robot 100, and may provide a result of classifying the received hand motion as one of a product addition operation or a product removal operation using a trained model based on an artificial neural network for the cart robot 100.

The communication interface 910 may transmit and receive data with external devices, such as the cart robot 100, a control center, or other AI servers, through wired and wireless communications or an interface. For example, the communication interface 910 may transmit and receive a trained model, a control signal, and the like, with the external devices.

The communication technology used by the communication interface 910 may be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC).

The input interface 920 may acquire data such as training data for model learning and input data for generating output using a trained model. The AI server 900 may acquire the training data and input data, described above, through the communication interface 910.

The input interface 920 may acquire raw input data. In this case, the controller 950 may preprocess the acquired data to generate training data to be inputted to model learning, or the preprocessed input data. In this case, the controller 950 or the learning processor 940 may extract an input feature as preprocessing with respect to the input data. The preprocessing with respect to input data refers to extracting one set of skeleton images from one set of depth maps with respect to hand motion.

The storage 930 may comprise a model storage 931 and a database 932.

The model storage 931 stores a model (or an artificial neural network 931a) learned or being learned through the learning processor 940, and stores an updated model when the model is updated through learning. The model storage 931 may classify the learned model into a plurality of versions depending on, for example, a learning time or a learning progress, where necessary.

The artificial neural network 931a illustrated in FIG. 9, is provided as an example of an artificial neural network including a plurality of hidden layers. However, an artificial neural network according to the embodiments of the present disclosure is not limited thereto.

The artificial neural network 931a may be implemented as hardware, software, or a combination of hardware and software. When a portion or the entirety of the artificial neural network 931a is implemented as software, one or more commands, constituting the artificial neural network 931a, may be stored in the storage 930.

The database 932 may store, for example input data acquired by the input interface 920, learning data (or training data) used for model learning, and learning history of a model. The input data stored in the database 932 is not only data processed suitable for model learning, but also raw input data itself.

The learning processor 940 learns a model consisting of an artificial neural network using training data. In detail, the learning processor 940 may repeatedly train an artificial neural network using various learning techniques, and thus determine optimized model parameters of the artificial neural network for classification of hand motion. For example, the training data may include one set of depth maps or one set of skeleton images with respect to hand motion.

The learning processor 940 may be configured to receive, classify, store, and output data used for data mining, data analysis, intelligent decision making, and machine learning algorithms and technologies. The learning processor 940 may comprise one or more memories configured to store data received, detected, sensed, generated, predefined, or outputted from other components or devices through the communication interface 910 or the input interface 920.

The learning processor 940 may comprise a memory integrated or implemented in the AI server 900. In some embodiments, the learning processor 940 may be implemented using a storage 930. Alternatively or additionally, the learning processor 940 may be implemented using a memory related to the AI server 900, such as an external memory directly coupled to the AI server 900 or a memory maintained in a device in communication with the AI server 900.

As another example, the learning processor 940 may be implemented using a memory maintained in a cloud computing environment, or another remote memory location accessible by the AI server 900 through a communications method such as a network.

The learning processor 940 may generally be configured to store data in one or more databases in order to identify, index, categorize, manipulate, store, retrieve, and output data for supervised or unsupervised learning, data mining, predictive analysis, or use in another machine. Here, the database may be implemented using a storage 930, a storage 150 of a cart robot 100, and a memory maintained in a cloud computing environment, or another remote memory location accessible by the AI server 900 through a communications method such as a network.

Data stored in the learning processor 940 may be used by one or more controllers of the controller 950 or the AI server 900 using one of various different types of data analysis algorithms and machine learning algorithms. As an example of such an algorithm, a k-nearest neighbor system, fuzzy logic (for example, possibility theory), a neural network, a Boltzmann machine, vector quantization, a pulse neural network, a support vector machine, a maximum margin classifier, hill climbing, an inductive logic system, a Bayesian network, (for example, a finite state machine, a Mealy machine, a Moore finite state machine), a classifier tree (for example, a perception tree, a support vector tree, a Markov Tree, a decision tree forest, an arbitrary forest), a reading model and system, artificial fusion, sensor fusion, image fusion, reinforcement learning, augmented reality, pattern recognition, automated planning, and the like, may be provided.

The learning processor 940 may allow an artificial neural network 931a to train (or learn) using training data or a training set. The learning processor 940 may allow the artificial neural network 931a to learn by directly acquiring data obtained by preprocessing input data, which the controller 950 acquires through the input interface 920, or may allow the artificial neural network 931a to learn by acquiring preprocessed input data stored in the database 932.

In detail, the learning processor 940 may repeatedly train the artificial neural network 931a using the various learning techniques described above, and thereby determine optimized model parameters of the artificial neural network 931a. That is, the learning processor 940 may repeatedly train the artificial neural network 931a using training data, and thereby generate a trained model for classification of hand motion.

The trained model may infer a result value while being mounted in the AI server 900 of an artificial neural network, and may be transferred to another device, such as the cart robot 100, through the communication interface 910 to be mounted. Moreover, when the trained model is updated, the updated trained model may be transferred to another device, such as the cart robot 100, through the communication interface 910 to be mounted.

Meanwhile, the present disclosure described above may be implemented as a computer-readable code in a medium on which a program is recorded. The computer readable medium includes various types of recording devices in which data readable by a computer system is stored. Examples of computer readable media may include a hard disk drive (HDD), a solid state disk (SSD), a silicon disk drive (SDD), a read-only memory (ROM), a random-access memory (RAM), CD-ROM, a magnetic tape, a floppy disk, an optical data storage device, and the like. Moreover, the computer may include the controller 190 of the cart robot 100.

Meanwhile, the computer programs may be those specially designed and constructed for the purposes of the present disclosure or they may be of the kind well known and available to those skilled in the computer software arts. Examples of program code include both machine codes, such as those produced by a compiler, and higher level code that may be executed by the computer using an interpreter.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

It should be apparent to those skilled in the art that various substitutions, changes and modifications which are not exemplified herein but are still within the spirit and scope of the present disclosure may be made.

Many modifications to the above embodiments may be made without altering the nature of the invention. The dimensions and shapes of the components and the construction materials may be modified for particular circumstances. While various embodiments have been described above, it should be understood that they have been presented by way of example only, and not as limitations.

What is claimed is:

1. A cart robot having a product loading space, the cart robot comprising:
   a code input interface configured to obtain a product identification code;
   a sensor configured to detect a hand motion of a user;
   a weight measuring device configured to measure a weight of one or more products contained in a product loading space; and
   a controller,
   wherein the controller acquires one set of hand images by analyzing the hand motion of the user, detected by the sensor, and, when there is no change in weight detected by the weight measuring device, classifies the one set of skeleton images corresponding to the hand motion of the user as one of a product addition operation or a product removal operation by using a trained model based on an artificial neural network and then updates a shopping list according to a result of classification.

2. The cart robot of claim 1, wherein the controller recognizes product data based on the product identification code obtained through the code input interface.

3. The cart robot of claim 1, wherein:
   the sensor is a depth sensor, and
   the set of hand images are a set of skeleton images acquired from a depth map of the hand motion detected by the depth sensor.

4. The cart robot of claim 1, wherein:
   the trained model is stored in an external server, and
   the controller provides the hand motion to the external server and determines whether the hand motion is the product addition operation or the product removal operation according to a result of classification obtained from the external server that classifies the hand motion using the trained model.

5. The cart robot of claim 1, further comprising a storage configured to store the trained model,
   wherein the controller stores the trained model provided by an external server in the storage.

6. The cart robot of claim 1, wherein the controller adds product data corresponding to the product identification code, obtained by the code input interface, to the shopping list, when the hand motion is a product addition operation.

7. The cart robot of claim 1, wherein the controller drives the code input interface to obtain a product identification code, and deletes product data corresponding to the product identification code from the shopping list when the hand motion is the product removal operation.

8. The cart robot of claim 1, further comprising a card reader configured to read a card to make a payment,
   wherein the controller processes the payment for the one or more products carried in the product loading space using the card read by the card reader.

9. The cart robot of claim 1, wherein the sensor is disposed in the product loading space.

10. The cart robot of claim 1, wherein the weight measuring device is disposed in a lower portion of the product loading space.

11. A method for managing a shopping list of a cart robot, comprising:
    acquiring product data based on a product identification code obtained by a code input interface;
    determining a change in weight of one or more products loaded in a product loading space, based on a measured value of the weight of the one or more products measured by a weight measuring device; and
    detecting a hand motion of a user,
    wherein the detecting the hand motion of the user comprises acquiring one set of hand images by analyzing the hand motion of the user, detected by the sensor, and, when there is no change in weight detected by the weight measuring device, classifying the one set of skeleton images corresponding to the hand motion of the user as one of a product addition operation or a product removal operation by using a trained model based on an artificial neural network and then updating a shopping list according to a result of the classifying.

12. The method of managing a shopping list of a cart robot of claim 11, wherein the acquiring the set of hand images comprises:
    acquiring a depth map of the hand motion, and
    acquiring a set of skeleton images based on the depth map.

13. The method of managing a shopping list of a cart robot of claim 11, wherein the updating a shopping list comprises:
    adding product data corresponding to the product identification code to the shopping list when the hand motion is a product addition operation.

14. The method of managing a shopping list of a cart robot of claim 11, wherein the updating a shopping list comprises:
    deleting product data corresponding to the product identification code from the shopping list when the hand motion is a product removal operation.

15. The method of managing a shopping list of a cart robot of claim 11, wherein the classifying the hand motion is performed by an external server.

16. The method of managing a shopping list of a cart robot of claim 11, further comprising:

processing payment for the one or more products loaded in the product loading space.

* * * * *